US012225242B2

(12) United States Patent
Yerli (10) Patent No.: US 12,225,242 B2
(45) Date of Patent: Feb. 11, 2025

(54) SYSTEM AND METHOD ENABLING LIVE BROADCASTING SESSIONS IN VIRTUAL ENVIRONMENTS

(71) Applicant: TMRW Foundation IP S. À R.L., Luxembourg (LU)

(72) Inventor: Cevat Yerli, Dubai (AE)

(73) Assignee: TMRW FOUNDATION IP S.ÀR.L., Luxembourg (LU)

( * ) Notice: Subject to any disclaimer, the term of this patent is extended or adjusted under 35 U.S.C. 154(b) by 0 days.

(21) Appl. No.: 18/059,314

(22) Filed: Nov. 28, 2022

(65) Prior Publication Data

US 2024/0179354 A1 May 30, 2024

(51) Int. Cl.
*H04N 21/218* (2011.01)
*H04N 21/258* (2011.01)
*H04N 21/81* (2011.01)

(52) U.S. Cl.
CPC . *H04N 21/21805* (2013.01); *H04N 21/25808* (2013.01); *H04N 21/8146* (2013.01)

(58) Field of Classification Search
CPC ....... H04N 21/21805; H04N 21/25808; H04N 21/8146
See application file for complete search history.

(56) References Cited

U.S. PATENT DOCUMENTS

| 9,292,163 | B2 | 3/2016 | Goldman et al. |
| 9,306,880 | B1 | 4/2016 | Hyndman et al. |
| 11,838,336 | B2* | 12/2023 | Young .................. G06T 19/003 |
| 2011/0225039 | A1 | 9/2011 | Goldman et al. |
| 2011/0244954 | A1* | 10/2011 | Goldman ................ A63F 13/65 463/30 |
| 2011/0246908 | A1* | 10/2011 | Akram .................. H04N 7/157 715/752 |
| 2012/0079046 | A1* | 3/2012 | Murphy ............. G06Q 30/0241 709/206 |
| 2015/0088622 | A1 | 3/2015 | Ganschow |
| 2015/0256351 | A1 | 9/2015 | Murphy et al. |
| 2015/0356693 | A1 | 12/2015 | Wiseman et al. |
| 2019/0206129 | A1* | 7/2019 | Khalid .................. A63F 13/88 |

(Continued)

FOREIGN PATENT DOCUMENTS

JP 2022-042980 A 3/2022

*Primary Examiner* — Kyu Chae
(74) *Attorney, Agent, or Firm* — BRYAN CAVE LEIGHTON PAISNER LLP (57) ABSTRACT

A method for providing live broadcasting sessions in virtual environments includes creating a virtual environment based on virtual environment creation instructions; connecting the virtual environment to an event that is broadcast through the virtual environment; setting up a live broadcasting session from the virtual environment comprising the event broadcast; sending an invitation to at least one invitee client device, wherein the invitation comprises 3D coordinates of the virtual environment specified for at least one invitee; opening up a communication channel enabling access to the at least one invitee to the virtual environment, wherein the invitee client device accesses the virtual environment through a user graphical representation that is positioned at the specified 3D coordinate of the virtual environment; and streaming the live broadcasting session to the at least one invitee client device. Corresponding systems and computer-readable media are also provided.

20 Claims, 5 Drawing Sheets

(56) References Cited

U.S. PATENT DOCUMENTS

| | | |
|---|---|---|
| 2020/0099891 A1 | 3/2020 | Valli et al. |
| 2022/0070241 A1 | 3/2022 | Yerli |
| 2023/0163987 A1* | 5/2023 | Young .................... G06V 40/20 345/419 |
| 2023/0316663 A1* | 10/2023 | Yerli ........................ G06T 13/40 345/633 |
| 2023/0326208 A1* | 10/2023 | Cooley-White ... H04N 21/2743 382/103 |

* cited by examiner

SYSTEM AND METHOD ENABLING LIVE BROADCASTING SESSIONS IN VIRTUAL ENVIRONMENTS

FIELD

The current disclosure relates generally to computer systems, and more specifically relates to systems, methods and computer-readable media enabling live broadcasting sessions in virtual environments.

BACKGROUND

Delivery of media content can be accomplished through traditional means, such as television broadcasting by cable, satellite, and antenna communications. However, such broadcasting experiences do not typically enable interacting with other remote viewers of the event, which could improve the user experience.

Some social media applications also act as streaming platforms that enable viewing a live event, such as YouTube™ live, Facebook™ live, and Twitch™, which enable users to comment in real-time about the event and to check various information, such as how many users are viewing the event live, live comments or reactions to the event. However, such platforms tend to limit the user experience to "flat" or 2D user interfaces where interaction with users or hosts tend to be performed by means of text input (e.g., chatting or commenting), giving a sensation of isolation. Live events, such as conferences, may also be held through teleconferencing platforms such as Skype™ and Zoom™ but the low levels of realism, lack of user presence, lack of shared space and the quality of interactions one can perform when comparing the real-life experience to these solutions contribute to a feeling of loneliness or boredom for many users.

What is required are technological solutions that provide users with a feeling of realism, presence, and an improved interaction and user experience during the broadcasting of live events such as sports, e-sports, live performances, conferences, and the like, that can promote user engagement for events.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

According to one aspect of the current disclosure, a system providing live broadcasting sessions in virtual environments comprises at least one server computer comprising at least one processor and memory storing instructions implementing a virtual environment streaming application configured to, when the instructions are executed by the at least one processor, cause the at least one server computer to create a virtual environment based on virtual environment creation instructions from a host client device connected to the at least one server computer via a network: connect the virtual environment to an event that is broadcast through the virtual environment: set up a live broadcasting session from the virtual environment comprising the event broadcast: send an invitation to at least one invitee client device, wherein the invitation comprises 3D coordinates of the virtual environment specified for at least one invitee: upon the at least one invitee accepting the invitation, open up a communication channel enabling access to the at least one invitee to the virtual environment, wherein the invitee client device accesses the virtual environment through a user graphical representation that is positioned at the specified 3D coordinate of the virtual environment: and stream the live broadcasting session to the at least one invitee client device.

In some embodiments, to open up the communication channel, the virtual environment streaming application selects between a selective forwarding unit (SFU) architecture to forward individual live streams from transmitting client devices to receiving client devices, and a multipoint control unit (MCU) architecture to forward a combined live stream of the live streams from the transmitting client devices to the receiving client devices, wherein the selecting is based on a threshold number of live streams from the transmitting client devices.

In some embodiments, the virtual environment streaming application enables invitees to interact with each other by exchanging real-time audio and video.

In some embodiments, the virtual environment streaming application enables a selection of an exclusive number of invitee user graphical representations to be visible to at least one host of the live broadcasting session, wherein at least one of the selected invitees is enabled to interact with the at least one host of the live broadcasting session. In further embodiments, the virtual environment streaming platform enables said interactions with the at least one host to become part of a public video stream that is shared with other client devices. In yet further embodiments, the virtual environment streaming application further displays a symbolic graphical representation of invitees not comprised within the selection of the exclusive number of invitees, wherein the graphical representation is provided in the form of user graphical representations, a numerical representations depicting the number of users, or a combination thereof. In yet further embodiments, the virtual environment streaming application further enables displaying graphical representations of reactions of invitees.

In some embodiments, the virtual environment streaming application enables the audience to explore the virtual environment by moving in the virtual environment. In yet further the presentation of such movement by at least some of the audience members is disabled for the view of the at least one host.

In some embodiments, the user graphical representation comprises a user 3D virtual cutout with a removed background, or a user real-time 3D virtual cutout with a removed background, or a video with removed background, or video without a removed background.

In some embodiments, the field of view of users including hosts and invitees is calculated from the specified 3D coordinate of the virtual environment where the corresponding user graphical representation is positioned.

In another aspect of the current disclosure, a method for providing live broadcasting sessions in virtual environments is provided. The method may be executed by at least one processor implementing instructions in memory of at least one server computer, the memory storing a virtual environment streaming application configured to perform at least In an embodiment, the method includes the steps of: creating a virtual environment based on virtual environment creation instructions from a host client device connected to the at least one server computer via a network: connecting the virtual environment to an event that is broadcast through the virtual environment: setting up a live broadcasting session that is broadcast from the virtual environment comprising the event broadcast: sending an invitation to at least one invitee client device, wherein the invitation comprises 3D coordinates of the virtual environment specified for at least one invitee: upon the at least one invitee accepting the invitation, opening up a communication channel enabling access to the at least one invitee to the virtual environment, wherein the invitee client device accesses the virtual environment through a user graphical representation that is positioned at the specified 3D coordinate of the virtual environment: and streaming the live broadcasting session to the at least one invitee client device.

In some embodiments, the method further comprises selecting between a selective forwarding unit (SFU) architecture to forward individual live streams from transmitting client devices to receiving client devices, and a multipoint control unit (MCU) architecture to forward a combined live stream of the live streams from the transmitting client devices to the receiving client devices, wherein the selecting is based on a threshold number of live streams from the transmitting client devices.

In some embodiments, the method further comprises enabling invitees to interact with each other by exchanging real-time audio and video.

In some embodiments, the method further comprises selecting an exclusive number of invitee user graphical representations to be visible to at least one host of the live broadcasting session, wherein at least one of the selected invitees is enabled to interact with the at least one host of the live broadcasting session. In further embodiments, the method further comprises enabling said interactions with the at least one host to become part of a public video stream that is shared with other client devices. In further embodiments, the method further comprises displaying a symbolic graphical representation of invitees not comprised within the selection of the exclusive number of invitees, wherein the graphical representation is provided in the form of user graphical representations, a numerical representation depicting the number of users, or a combination thereof. In further embodiments, the method further comprises displaying graphical representations of reactions of invitees.

In some embodiments, creating the virtual environment comprises retrieving user preference data: and using the user preference data to customize the virtual environment.

In some embodiments, the method further comprises retrieving and displaying media from one or more third party databases.

In another aspect of the current disclosure, a non-transitory computer readable medium comprising instructions stored in memory which, when executed by at least one processor, cause at least one server computer to perform steps comprising: creating a virtual environment based on virtual environment creation instructions from a host client device connected to the at least one server computer via a network: connecting the virtual environment to an event that is broadcast through the virtual environment: setting up a live broadcasting session that is broadcast from the virtual environment comprising the event broadcast: sending an invitation to at least one invitee client device, wherein the invitation comprises 3D coordinates of the virtual environment specified for at least one invitee: upon the at least one invitee accepting the invitation, opening up a communication channel enabling access to the at least one invitee to the virtual environment, wherein the invitee client device accesses the virtual environment through a user graphical representation that is positioned at the specified 3D coordinates of the virtual environment: and streaming the live broadcasting session to the at least one invitee client device, wherein a field of view of the invitee (e.g., as presented to a user of the invitee client device) is calculated from the specified 3D coordinates of the virtual environment.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below, and particularly pointed out in the claims filed with the application. Such combinations have advantages not specifically recited in the above summary. Other features and advantages will be apparent from the accompanying drawings and from the detailed description that follows below.

BRIEF DESCRIPTION OF THE DRAWINGS

Specific features, aspects and advantages of the present disclosure will be better understood with regard to the following description and accompanying drawings, where.

DETAILED DESCRIPTION

In the following description, reference is made to drawings which show by way of illustration various embodiments. Also, various embodiments will be described below by referring to several examples. It is to be understood that the embodiments may include changes in design and structure without departing from the scope of the claimed subject matter.

The current disclosure addresses at least some of the drawbacks described in the background through a system, method and computer-readable medium configured to provide live broadcasting sessions of events in virtual environments. Systems, methods and computer-readable media of the current disclosure enable the broadcasting of events, such as real or digital live or pre-recorded events, within virtual environments, e.g., 3D virtual environments. The 3D virtual environments may connect to events to create live broadcasting sessions that may be broadcast to a plurality of users through corresponding client devices. Invited users may access the virtual environment through corresponding invitations comprising 3D coordinates so that once the invitation is accepted, the users may be positioned at the 3D coordinates of the virtual environment through a corresponding user graphical representation. Hosts of the event may allow a certain number of exclusive users (e.g., friends, special guests or other people relevant to the event) to become visible to them through their user graphical representations, while the rest of the audience may be displayed in the form of a symbolic representation. The interactions with the audience may become part of the live broadcasting session so that other users (e.g., all users or some subset of users) may view them. Although current systems do enable viewing events as well as some types of interactions (e.g., commenting, chatting, or live video broadcasting), providing users the ability to access live broadcasting sessions of the events in 3D virtual environments, as provided by the current disclosure, may increase user presence and the quality of experience and interactions between users and hosts of live broadcasting sessions by enabling a shared 3D space where such users may communicate and interact.

Figure 1:
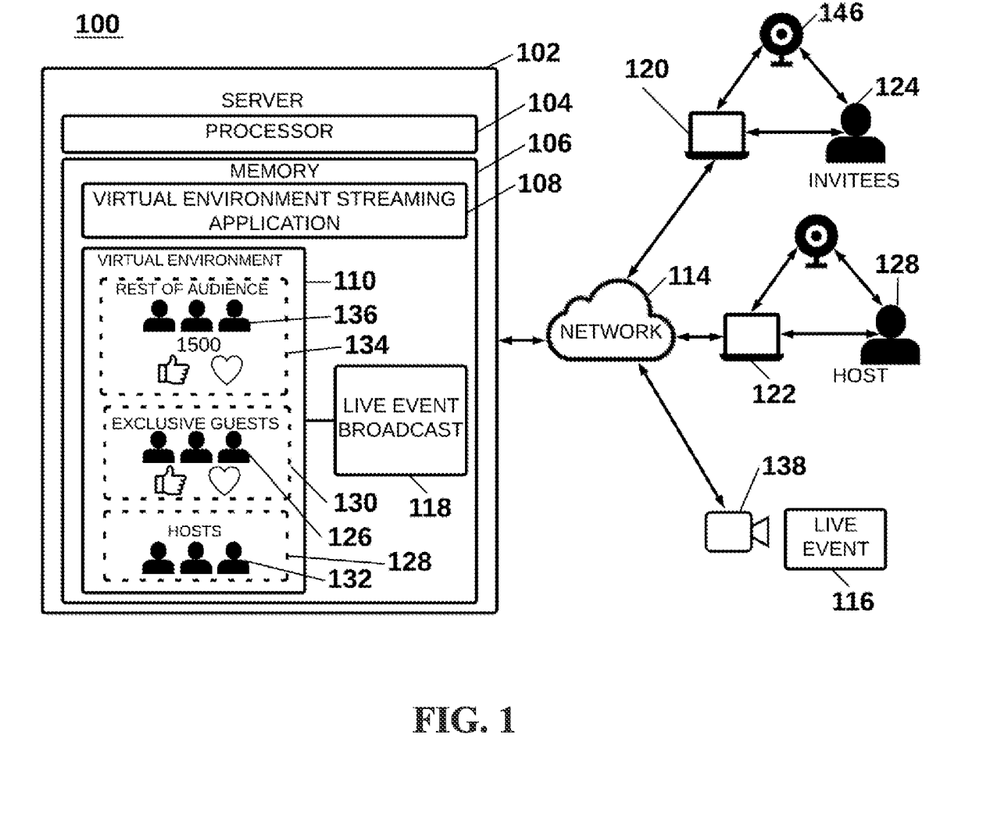
FIG. 1 depicts a schematic representation of a system enabling live broadcasting sessions in virtual environments, according to an embodiment.

FIG. 1 depicts a schematic representation of system 100 enabling live broadcasting sessions in virtual environments, according to an embodiment.

System 100 comprises at least one server computer 102 comprising at least one processor 104 and memory 106 storing instructions implementing a virtual environment streaming application 108. The virtual environment streaming application 108 may be configured, when the instructions are executed by the at least one processor 104, to create a virtual environment 110 based on virtual environment creation instructions from a host client device 122 connected to the at least one server computer 102 via a network 114. Subsequently, the virtual environment streaming application 108 may connect the virtual environment 110 to an event 116 that is broadcast through the virtual environment 110. When such a connection is established, the virtual environment streaming application 108 sets up a live broadcasting session from the virtual environment 110 comprising a live event broadcast 118 of the event. The event may thus be instantiated and displayed by the virtual environment streaming application 108 on a projecting surface within the virtual environment 110, such as a virtual client device screen (e.g., TV, tablet, or mobile device screen), a projection screen, a projection wall, a panel, a billboard, the ceiling, etc.

The virtual environment streaming application 108 then sends an invitation to at least one invitee client device 120. Such an invitation may be sent based on a request received from an inviting client device, such as from a host client device 122 or, alternatively, client devices from other inviting users that may have such an entitlement. The invitation may be sent through any suitable channel such as email, SMS, social media application, messaging application, and the like, and may comprise user information that may help in identifying the invitee, such as name, location, email address, phone number, etc. In some embodiments, the invitation comprises 3D coordinates of the virtual environment 110 specified for at least one invitee 124. Upon the at least one invitee 124 accepting the invitation, the virtual environment streaming application 108 opens up a communication channel enabling access to the at least one invitee 124 to the virtual environment 110, wherein the invitee client device 120 accesses the virtual environment 110 through a user graphical representation 126 that is positioned at the specified 3D coordinate of the virtual environment, thus presenting a representation (e.g., an avatar or real-time video broadcast) of the user within the virtual environment 110. Finally, the virtual environment streaming application 108 streams the live broadcasting session to the at least one invitee client device 120.

In the current disclosure, a "broadcasting session" refers to a teleconferencing session that is hosted through the virtual environment streaming application 108 and which comprises a broadcast of an event from within the virtual environment. In some embodiments, the broadcast is performed by instantiating and projecting the event on at least one surface of the virtual environment. The broadcasting session may be attended by a plurality of users that may view and experience the broadcast of the event, and which may interact with each other and, if enabled, with at least one host of the broadcasting session, to view the presentation of the event. Once the event is instantiated and projected on the at least one surface of the virtual environment in the broadcasting session, all users within the virtual environment may be able to view the broadcast event, provided that their field of view at a given moment includes the projecting surface.

In some embodiments, the at least one host may select the projecting surface, and may decide to turn it on or off, or to switch the projecting surface to another one. In some embodiments, the projecting surface comprising the projected event may be further enlarged or shrunk down, or may be displaced to other areas of the virtual environment. For example, if the projecting surface is a TV screen, the TV screen may be enlarged or may be moved to another area that is more easily viewed by invitees. The virtual environment broadcasting application 108 may accordingly be further configured to adjust the resolution of the projecting surface comprising the projected event.

In the current disclosure, an event may be a real-world or digital event, live or pre-recorded, that can be broadcast through a broadcasting session, for example, e-sports, real-world sports matches, performances, fashion shows, beauty pageants, film releases, videogame releases, theater plays, circus performances, news reports, and the like. The events may be introduced, narrated, commented and/or discussed by one or more hosts and/or moderators from within the virtual environment 110, and may enable interactions with at least some members of the audience based on entitlements. Such interactions may be enabled through user graphical representations of the hosts and of the audience, which may be generated and inserted into the virtual environment.

In some embodiments, the field of view of invitees and other users (e.g., hosts 128 and other members of the audience) is calculated from the specified 3D coordinate of the virtual environment 110 where the invitee user graphical representation 126 has been positioned. Thus, each user graphical representation 126 may comprise a personalized viewing perspective that is set from the specific location of each of the user graphical representations 126 to display the virtual scene and live event to the corresponding user from his or her position within the virtual environment 110. In some embodiments, the viewing perspective is updated as a user manually navigates through the virtual environment 110 via the graphical user interface. In yet further embodiments, the viewing perspective is established and updated automatically by using a virtual camera, wherein the virtual camera is updated automatically by tracking and analyzing user eye-and-head-tilting data, or head-rotation data, or a combination thereof.

Thus, in some embodiments, the virtual environment 110 is a 3D virtual environment that enables users to view an event from within the provided virtual space that is shared by the users and which is accessed through their corresponding user graphical representations 126 that are positioned at the specified 3D coordinates of the virtual environment 110. Presentation of the users within a shared 3D virtual environment 110, along with enabled interactions and communication between users (e.g., between invitees 124, hosts 128, and a combination thereof), increases user presence and promotes engagement and/or attendance to the live broadcasting sessions and corresponding live events, providing a realistic and entertaining user experience.

In some embodiments, the virtual environment streaming application 108 enables invitees 124 to interact with each other by exchanging real-time audio and video. Such interactions and communication are provided within the shared space of the virtual environment 110, promoting interaction between users. In further embodiments, other interactions may also be enabled between users, such as chatting, screen sharing, recording, voting, media file sharing, emoticon sending, virtually hugging, hand-raising, hand-shaking, walking, content adding, object moving, booing, cheering, screaming, gesticulating, projecting, laser-pointing, game-playing, and purchasing, amongst others.

In some embodiments, the virtual environment streaming application 108 enables a selection of an exclusive number of invitee user graphical representations 126 to be visible to the at least one host 128 of the live broadcasting session, wherein at least one of the selected exclusive invitees 130 is enabled to interact with the at least one host 128 of the live broadcasting session through a corresponding user graphical representation 126. The exclusive invitees may be selected by the at least one host 128 or by another user with such an entitlement, and may represent, for example, close friends of the hosts, VIPs, or people with any type of special relevance to the live broadcasting session. These exclusive invitees may be visible to the at least one host 128 through their user graphical representations 126. The at least one host 128 may also be visible within the virtual environment 110 to the at least one exclusive guest 130 via a host user graphical representation 132.

In yet further embodiments, the virtual environment streaming application 108 enables interactions with the at least one host 128 to become part of the public video stream that is shared with other client devices from the rest of the audience 134. In the current disclosure, the term "rest of the audience" refers to any user or invitee that is not part of the exclusive guests 130. For example, if a member of the exclusive audience asks a question, shares a screen or presents some information, such a data and/or interaction may be displayed to the rest of the audience 134 as part of the live broadcast from the live broadcasting session. In yet further embodiments, the virtual environment streaming application 108 further displays a symbolic user graphical representation 136 of invitees from the rest of the audience 134, wherein the graphical representation is provided in the form of user graphical representations, a numerical representations depicting the number of users, or a combination thereof. For example, if 1000 people are attending the live broadcasting session, there may be 5 people that are part of the exclusive guests 130 and 995 people that are included as the rest of the audience 134. The exclusive guests 130 may each be represented by a corresponding user graphical representation 126 while the rest of the audience 134 may be represented by a symbolic graphical representation 136, which may take the form of a symbolic crowd including symbolic faces, full bodies, silhouettes, shadows, masks, cartoons, and the like, that can represent the rest of the audience 134.

In some embodiments, members of the audience, including exclusive guests 130 and the rest of the audience 134, may be provided a fixed location based on the 3D coordinates included in the invitation, or may be enabled to move and explore within the virtual environment from the original 3D coordinates. In yet further embodiments, the virtual environment broadcasting application may be further configured to enable exclusive guests 130 to disable their image to the at least one host, such as, for example, to allow for the exclusive guests 130 to freely explore the virtual environment during the broadcasting session without interrupting the at least one host 128, and/or in order for such a displacement not to be shown in the video broadcast to other client devices.

In some embodiments, the events 116 that may be broadcast in the broadcasting sessions refer to any real or digital event that is occurring in real-time. Real events may be broadcast in real-time through at least one camera 138. However, in other embodiments, the virtual environment streaming application 108 also enables hosting a live broadcasting session of a pre-recorded event. For example, football match that has been recorded previously may be transferred to the at least one server 102 for replaying at the virtual environment 110 during a broadcasting session. In further embodiments, the virtual environment streaming application 108 further enables displaying graphical representations of reactions of invitees, such as from exclusive guests 130 or the rest of the audience 134. For example, such representations may be marked as emojis including thumbs-up or down, hearts, smiles, happy faces, sad faces, angry faces, and the like, representing the reaction of the invitees.

In some embodiments, the virtual environment streaming application 108 momentarily enables members from the rest of the audience 110 to interact with the at least one host 128. A user from the rest of the audience 134 may raise his or her hand through a user interface, which may send a signal to the at least one host client device 122, prompting the at least one host 128 to allow the user to momentarily interact with the at least one host 128 through a corresponding user graphical representation 136. Such an interaction may be included in the live broadcasting session that may be watched by the exclusive guests 130 and other members from the rest of the audience 134.

In some embodiments, the user graphical representation 126 comprises a user 3D virtual cutout with a removed background, or a user real-time 3D virtual cutout with a removed background, or a video with removed background, or video without a removed background.

In the current disclosure, a user 3D virtual cutout may include a virtual replica of a user constructed from a user-uploaded or third party-source 2D photo. In an embodiment, the user 3D virtual cutout is created via a 3D virtual reconstruction process through machine vision techniques using the user-uploaded or third party-source 2D photo as input data, generating a 3D mesh or 3D point cloud of the user with removed background. In one embodiment, the user 3D virtual cutout may have static facial expressions. In another embodiment, the user 3D virtual cutout may comprise facial expressions updated through the camera feed. In yet another embodiment, the user 3D virtual cutout may comprise expressions that may be changed through buttons on the user graphical interface, such as buttons that permit the user 3D virtual cutout to smile, frown, be serious, and the like. In yet a further embodiment, the user 3D virtual cutout uses combinations of aforementioned techniques to display facial expressions. After generating the user 3D virtual cutout, the status and/or facial expressions of the user 3D virtual cutout may be continuously updated by, e.g., processing the camera feed from the user.

A user real-time 3D virtual cutout may include a virtual replica of a user based on the real-time 2D or 3D live video stream data feed obtained from the camera and after having the user background removed. In an embodiment, the user real-time 3D virtual cutout is created via a 3D virtual reconstruction process through machine vision techniques using the user live data feed as input data by generating a 3D mesh or 3D point cloud of the user with removed background. For example, the user real-time 3D virtual cutout may be generated from 2D video from the camera 146 that may be processed to create a holographic 3D mesh or 3D point cloud. In another example, the user real-time 3D virtual cutout may be generated from 3D video from depth cameras (e.g., LIDARs or any depth camera) that may be processed to create a holographic 3D mesh or 3D point cloud. Thus, the user real-time 3D virtual cutout represents the user graphically in three dimensions and in real time.

A video with removed background may include a video streamed to a client device, wherein a background removal process has been performed so that only the user may be visible and then displayed utilizing a polygonal structure on the receiving client device. Video without removed background may include a video streamed to a client device, wherein the video is faithfully representing the camera capture, so that the user and his or her background are visible and then displayed utilizing a polygonal structure on the receiving client device. The polygonal structure can be a quad structure or more complex 3D structures used as a virtual frame to support the video.

In some embodiments, the user graphical representation 126 is created by a process comprising receiving, by the at least one server computer 102, a live data feed captured by at least one camera 146 connected to a sending client device: sending the captured data to the receiving client device via the server 102 or through a P2P architecture: performing a background removal of the user of the sending client device in order to extract only the image representing the user sending user: and inserting, by the receiving client device, the user graphical representation 126 into the virtual environment 110.

In some embodiments, the data used as input data comprised in the live data feed and/or user-uploaded or third-party-source 2D photo comprises 2D or 3D image data, 3D geometries, video data, media data, audio data, textual data, haptic data, time data, 3D entities, 3D dynamic objects, textual data, time data, metadata, priority data, security data, positional data, lighting data, depth data, and infrared data, amongst others.

In some embodiments, the one or more hosts 132, which may also be moderators of the live broadcasting sessions, may introduce, narrate, comment and/or discuss the live or pre-recorded event while allowing for interactions and communication between themselves and with the at least some of the exclusive guests 130 and rest of the audience 134.

In some embodiments, the virtual environment 110 refers to a virtual scene, world or universe where users, including hosts, exclusive guests 130 and the rest of the audience 134 can explore, subscribe to and interact with published media content items therein, communicate with each other, and the like. The virtual environment 110 comprises assets that may be modeled through a plurality of software platforms or software engines. The assets may be defined in a scene description, which may be in the form of a scene graph comprising properties and values and which may be based on models. The models are descriptions of a three-dimensional object defined by data comprising geometry, textures, physics, lighting, materials, etc.

A virtual environment 110 thus refers to a virtual construct (e.g., a virtual model) that may be designed through any suitable 3D modelling technique through computer assisted drawing (CAD) methods. In some embodiments, the virtual environment 110 refers to a virtual construct that is scanned from a real construct (e.g., a physical room) through any suitable scanning tools, comprising image-scanning pipelines input through a variety of photo, video, depth measurements, and/or simultaneous location and mapping (SLAM) scanning in order to generate the virtual environment 110. For example, radar-imaging, such as synthetic-aperture radars, real-aperture radars, Light Detection and Ranging (LIDAR), inverse aperture radars, monopulse radars, and other types of imaging techniques may be used to map and model real-world constructs and turn them into a virtual environment 110. In other embodiments, the virtual environment 110 is a virtual construct that is modelled after a real construct (e.g., a room, building or facility in the real world).

The assets included in the virtual environment 110 may comprise any of 2D or 3D image data, 3D geometries, video data, media data, audio data, textual data, haptic data, time data, 3D entities, 3D dynamic objects, textual data, time data, priority data, security data, positional data, lighting data, depth data, infrared data, and corresponding metadata, amongst others.

In some embodiments, the client devices 120 may be one or more of mobile devices, personal computers, laptops, game consoles, media centers, smart contact lenses, and head-mounted displays, amongst others. The cameras 146/138 may be one or more of a 2D or 3D camera, 360-degree camera, web-camera, RGBD camera, CCTV camera, professional camera, mobile phone camera, depth camera (e.g., LIDAR), or a light-field camera, amongst others.

In some embodiments, the virtual environment 110 utilizes a hybrid system architecture, which includes a client-server side and a peer-to-peer (P2P) side. In an embodiment the client-server side comprises web or application servers. The client-server side may be further configured to include secure communication protocols: micro-services; a database management system: a database: and/or a distributed message and resource distribution platform. Server-side components may be provided along with the client devices that communicate to the servers through a network. The client-server side defines the interaction between the one or more clients and the server through the network, including any processing performed by a client side, a server side, or a receiving client side. In an embodiment, one or more of the corresponding clients and servers perform the necessary image and media processing according to various rule-based task allocation combinations. In an embodiment, the web or application servers are configured to receive client requests employing the secure communication protocols and process the client requests by requesting the micro-services or data corresponding to the requests from the database using a database management system. The micro-services are distributed utilizing a distributed message and resource distribution platform using the publish-subscribe model.

The P2P side comprises a P2P communication protocol enabling real-time communication between client devices in the virtual environment 110: and a rendering engine configured to enable the client device to perform real-time 3D rendering of live session elements therein included (e.g., user graphical representations) in the virtual environment. An example of a suitable P2P communication protocol may be a Web Real-Time Communication (WebRTC) communication protocol, which is collection of standards, protocols, and JavaScript APIs, which, in combination, enable P2P audio, video, and data sharing between peer client devices. An example of a suitable rendering engine may be 3D engines based on WebGL, which is a JavaScript API for rendering 2D and 3D graphics within any compatible web browser without the use of plug-ins, allowing accelerated usage of physics and image processing and effects by one or more processors of the client device (e.g., one or more graphic processing units (GPUs)). In an embodiment, the P2P side further includes a computer vision library configured to enable the client device to perform real-time computer vision tasks in the virtual environment. An example of a suitable computer vision library may be OpenCV, which is a library of programming functions configured mainly for real-time computer vision tasks. Using such a hybrid model of communication may enable rapid P2P communications between users reducing latency problems while providing web services and resources to each session, enabling a plurality of interactions between users and with content in the virtual environment.

In some embodiments, the client devices 122 and at least one cloud server computer 102 connect through a wired or wireless network 114. In some embodiments, the network may include millimeter-wave (mmW) or combinations of mmW and sub 6 GHZ communication systems, such as fifth generation wireless systems communication (5G). In other embodiments, the system may connect through wireless local area networking (Wi-Fi). In other embodiments, the system may communicatively connect through fourth generation wireless systems communication (4G), may be supported by 4G communication systems, or may include other wired or wireless communication systems.

In some embodiments, the at least one server computer 102 is a media server computer using a Multipoint Control Unit (MCU) topology, or a selective forwarding unit (SFU) topology, or a Traversal Using Relay NAT (TURN) topology, or a spatially analyzed media server topology (SAMS).

In some embodiments, the at least server computer 102 may be an intermediary server, meaning that the server is used to facilitate and/or optimize the exchange of data between client devices. In such embodiments, the at least one cloud server may manage, analyze process and optimize incoming image and multimedia streams and manage, assess, optimize the forwarding of the outbound streams as a router topology (for example but not limited to SFU, SAMS, multimedia server routers, or an image and media processing (for example but not limited to decoding, combining, improving, mixing, enhancing, augmenting, computing, manipulating, encoding) and forwarding server topology (for example but not limited to MCU, cloud media mixers, cloud 3D renderer, and the like), or other server topologies.

In embodiments where the intermediary server is a SAMS, such media server manages, analyze and processes incoming data of each publishing client device (e.g., including but not limited to meta-data, priority data, data classes, spatial structure data, three dimensional positional, orientation or locomotion information, image, media, scalable video codec based video) and in such analysis optimizes the forwarding of the outbound data streams to each client device by modifying, upscaling or downscaling the media for temporal (varying frame rate), spatial (e.g., different image size), level of detail, quality (e.g., different compression or encoding based qualities) and color (e.g., color resolution and range) based on the specific receiving client device user's spatial, three dimensional orientation, distance and priority relationship to such incoming data achieving optimal bandwidths and computing resource utilizations for one or more user client devices.

Figure 2:
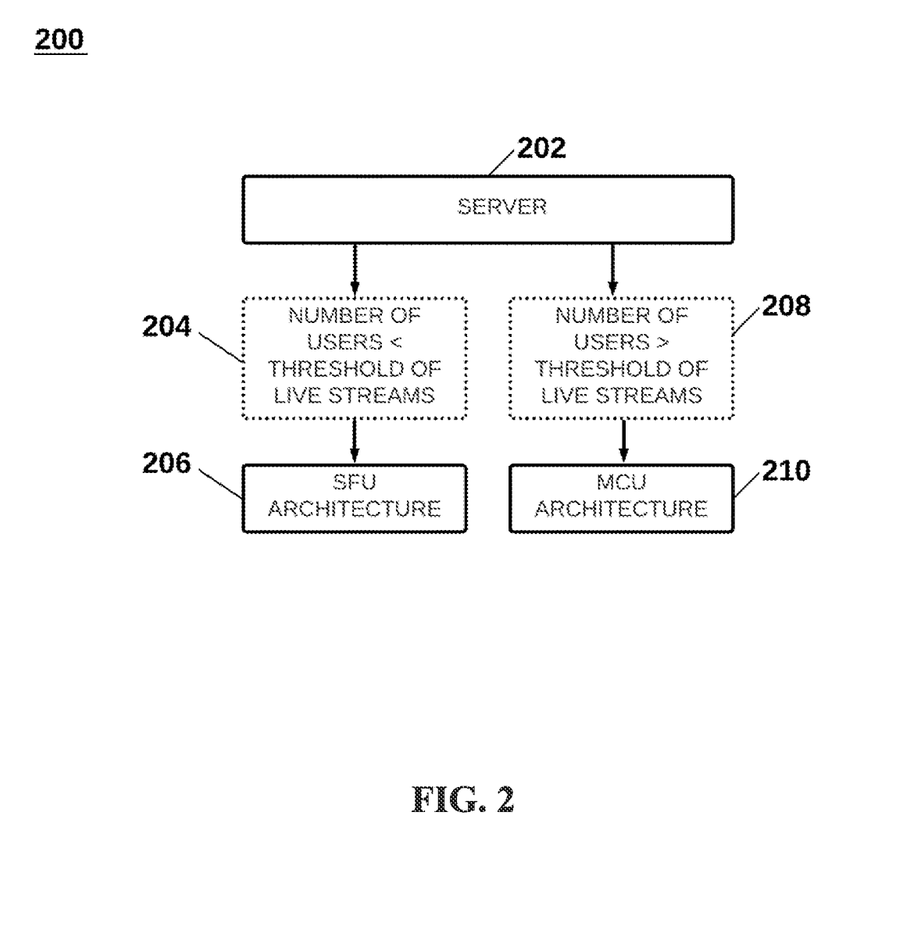
FIG. 2 depicts a schematic representation of server architecture options that the server may utilize depending on the number of user live streams, according to an embodiment.

FIG. 2 depicts a schematic representation of a sample server architecture options 200 that at least one server computer 202 of the current disclosure may utilize depending on the number of user live streams, according to an embodiment.

When opening up a communication channel for enabling interactions within a virtual environment, as disclosed with reference to system 100 of FIG. 1, a server computer 202 may select between an SFU architecture and an MCU architecture to present live streams from transmitting client devices. Such live streams may be presented in the form of user graphical representations of users, which may be generated from video of those users captured by the transmitting client devices. In an illustrative scenario, under a certain threshold of live streams from client devices 204, the virtual environment streaming application employs an SFU architecture 206 to forward individual live streams to the receiving client devices from the least one central server computer 202 and receive a stream captured by transmitting client devices from all other participants via the same at least one central server computer 202. The SFU architecture 206, utilizing the logic embedded in programs stored in memory of the at least one server computer 202, decides which media streams to forward to other users at receiving client devices. Thus, as the SFU architecture 206 enables the at least one central server computer 202 to receive and forward all individual media streams from all users at transmitting client devices to receiving client devices, then such an architecture may be suitable for using in embodiments of the current disclosure under a certain threshold of live streams, such as, e.g., below 5, 20, or some other threshold number of live streams from users at transmitting client devices.

When opening up the communication channel for enabling interactions within a virtual environment, above the threshold of live streams 208, the virtual environment streaming application employs an MCU architecture to forward a combined live stream to the receiving client devices. An MCU architecture assumes that each user sends his or her stream from transmitting client devices to at least one server computer 202, which decodes the stream, rescales it, composes a new stream from all received streams, encodes it, and sends a single stream to all other participants at receiving client devices. Thus, the MCU combines all received streams from transmitting client devices before sending a combined media stream to all participants at receiving client devices, which may be more efficient and suitable above a certain threshold of live streams, such as, e.g., above 5, 20, or some other threshold number of live streams from users at transmitting client devices.

Figure 3:
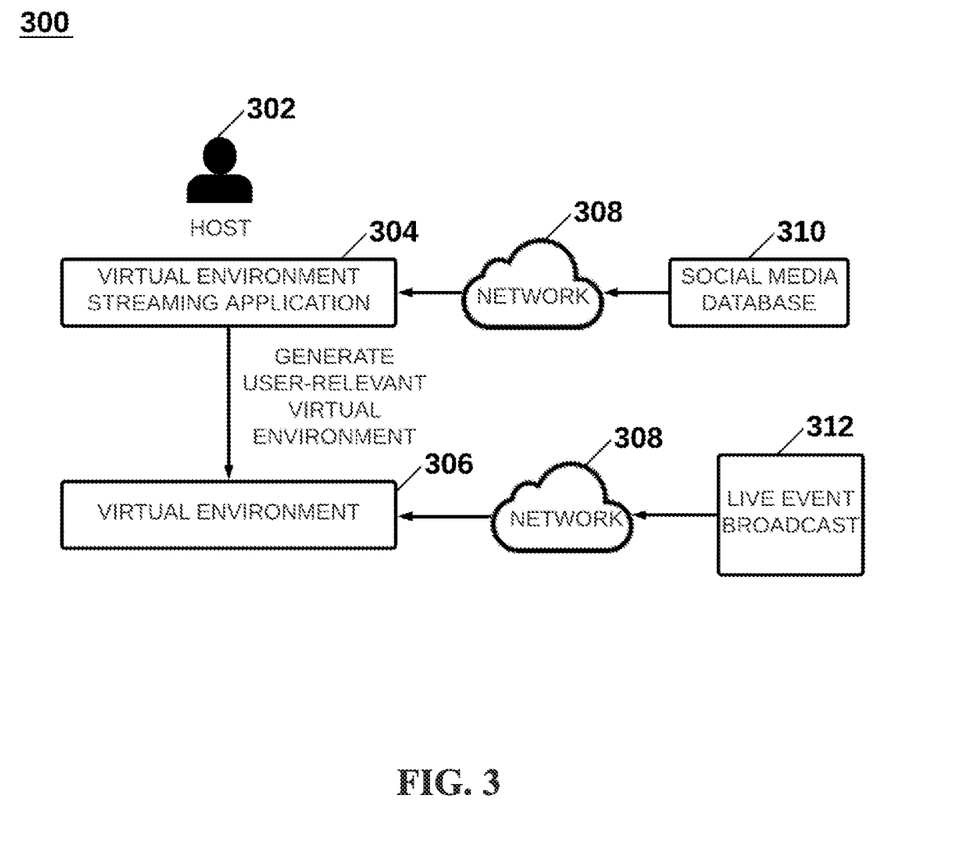
FIG. 3 depicts a schematic representation of a virtual environment generation by a host utilizing profile data, according to an embodiment.

FIG. 3 depicts a schematic representation of a virtual environment generation process 300 by utilizing profile data, according to an embodiment.

In FIG. 3, a host 302 uses a graphical user interface of a virtual environment streaming application 304 though a client device in order to create a virtual environment 306. The virtual environment streaming application 304 may be a downloadable application or may be available online from a browser without the need to download any software programs. Responsive to the virtual environment streaming application 304 receiving the user command to create a virtual environment 306, the virtual environment streaming application 302 retrieves through a network 308 user preference data from a database, such as a social media database 310, and uses the user preference data to generate a virtual environment 306 comprising a user-relevant style. The virtual environment streaming application 304, from the retrieved user preference data, extracts style-relevant data such as colors, shapes, decoration-related information, and the like that can be used for generating the virtual environment 306.

In other embodiments, the profile of the host 302 is input manually by the host 302 through the corresponding host client device. Manually inputting the profile may be a feature enabled by the virtual environment streaming application 304. Such a profile may request style-relevant information that may be used by the virtual environment streaming application 304 to accordingly create the virtual environment 306. For example, the profile may request adding favorite colors, architectural styles, locations, backgrounds, surface area, etc. The profile may further request data such as require user number to calculate a capacity and size of the virtual environment. The virtual environment streaming application 304 may use predefined templates to create the virtual environment based on the retrieved profile data, or may use more complex algorithms through machine learning and artificial intelligence to generate a new and unique virtual environment from the extracted data that is specifically created for the user.

Once the virtual environment 306 has been created, the virtual environment 306 may thereafter retrieve, through the virtual environment streaming application 304 via the network 308, the live event broadcast 312 that is thereafter streamed through the virtual environment 306 by instantiating and projecting the live event on at least one surface of the virtual environment.

Figure 4:
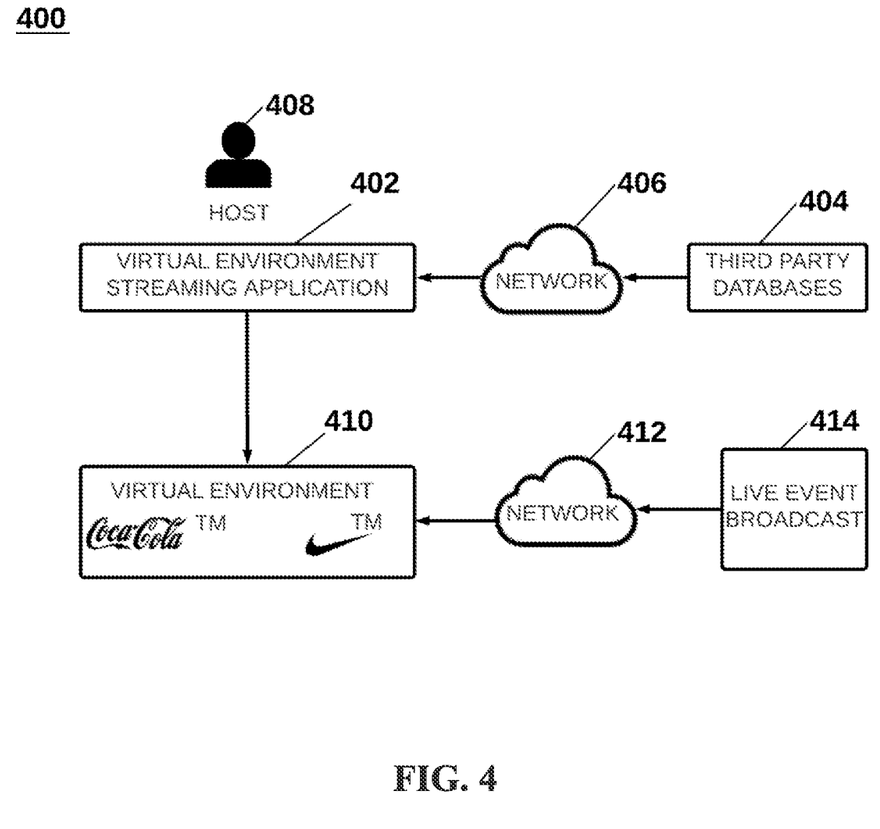
FIG. 4 depicts a schematic representation of an embodiment of third party media publishing within the virtual environment.

FIG. 4 depicts a schematic representation of a third-party media publishing process 400 within a virtual environment, according to an embodiment.

The third-party media publishing process 400 is performed by the virtual environment streaming application 402 by retrieving, upon request from third parties such as companies representing one or more brands, media content from corresponding third-party databases 404 through a network 406. Such requests may need to be approved by one or more hosts 408 of the virtual environment. The sponsored media may then be published on a created virtual environment 410 that retrieves, through the virtual environment streaming application 402 via a network 412, the live event broadcast 414. The sponsored media may be static or dynamic media data that can be instantiated and projected on at least one surface of the virtual environment to advertise corresponding brands to attendees. For example, the sponsored media may be published on one or more billboards, panels, walls, pillars, tables, and the like. Thus, the virtual environment 410 may serve as a publishing channel for companies to advertise themselves during live event broadcasting sessions.

Figure 5:
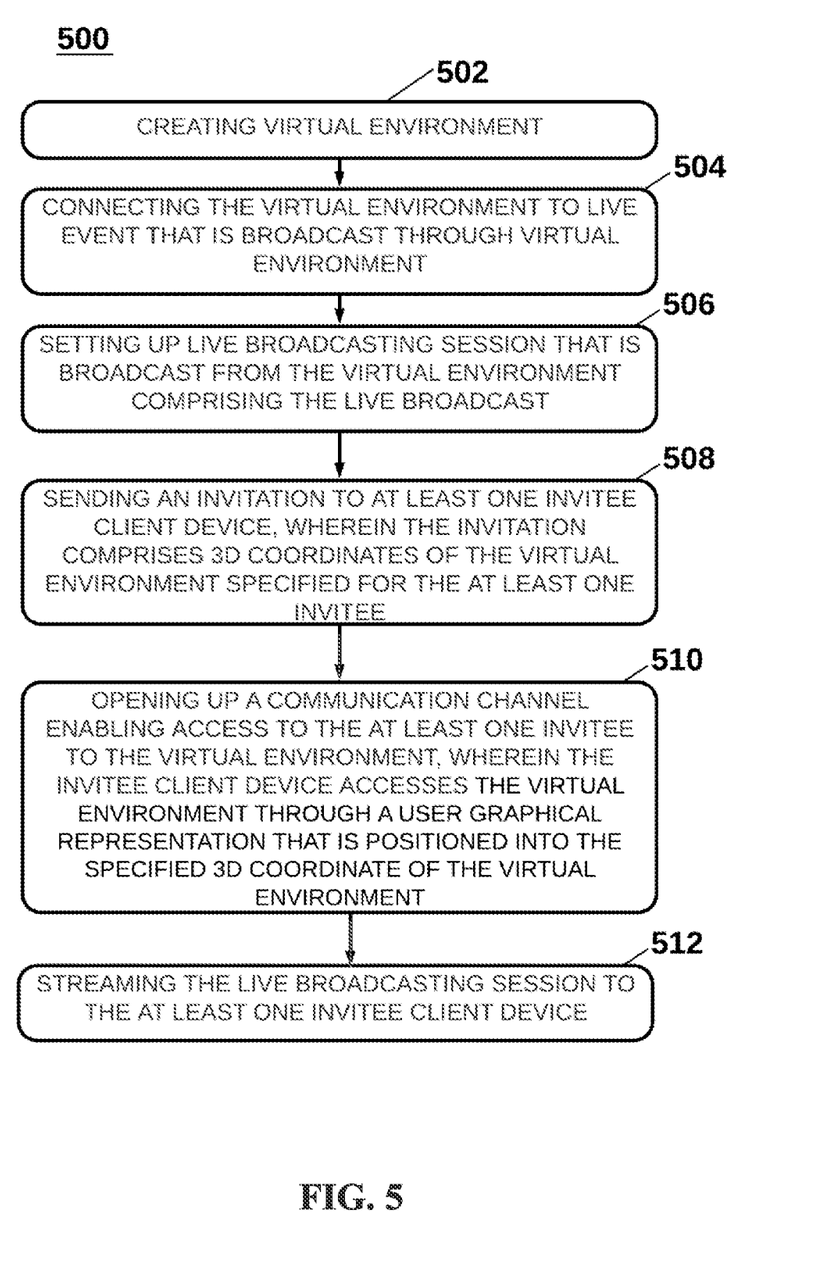
FIG. 5 depicts block diagram of a method enabling live broadcasting sessions in virtual environments, according to an embodiment.

FIG. 5 depicts a method 500 enabling live broadcasting sessions in virtual environments, according to an embodiment. The method 500 for providing live broadcasting sessions in virtual environments may be executed by a system, such as system 100 of FIG. 1, using at least one processor implementing instructions in memory of at least one server computer, the instructions comprising a virtual environment streaming application.

The method 500 may begin in step 502 by creating a virtual environment based on virtual environment creation instructions from a host client device connected to the at least one server computer via a network. Then, in step 504, the method 500 may proceed by connecting the virtual environment to an event that is broadcast through the virtual environment. Such events may be real or digital live events that are broadcast in real time through at least one camera. However, in other embodiments, the virtual environment streaming application also enables hosting a live broadcasting session of a pre-recorded event.

In step 506, the method may continue by setting up a live broadcasting session that is broadcast from the virtual environment comprising the event broadcast. In step 508, the method 500 may continue by sending an invitation to at least one invitee client device, wherein the invitation comprises 3D coordinates of the virtual environment specified for the at least one invitee. Such an invitation may be sent from a request received from an inviting client device, such as from a host client device or, alternatively, client devices from other inviting users. The invitation may be sent in response to the virtual environment streaming application receiving an invite generation from the at least one host. Furthermore, the invitation may be sent through any suitable channel such as email, SMS, social media application, messaging application, and the like, and may comprise user information that may help in identifying the invitee, such as name, location, email address, phone number, etc.

Upon the at least one invitee accepting the invitation, the method may continue in step 510 by opening up a communication channel enabling access to the at least one invitee to the virtual environment. In some embodiments, the invitee client device accesses the virtual environment through a user graphical representation that is positioned at the specified 3D coordinate of the virtual environment. Finally, in step 512, the method may end by streaming the live broadcasting session to the at least one invitee client device.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. The description is thus to be regarded as illustrative instead of limiting.

The invention claimed is:

1. A system providing live broadcasting sessions in virtual environments, comprising:
    at least one server computer comprising at least one processor and memory storing instructions implementing a virtual environment streaming application configured to, when the instructions are executed by the at least one processor, cause the at least one server computer to:
    create a virtual environment based on virtual environment creation instructions from a host client device connected to the at least one server computer via a network;
    connect the virtual environment to an event that is broadcast through the virtual environment, the event being a live real-world event;
    set up a live broadcasting session from the virtual environment comprising a broadcast of the event;
    send an invitation to at least one invitee client device, wherein the invitation comprises 3D coordinates of the virtual environment specified for at least one invitee;
    upon the at least one invitee accepting the invitation, open up a communication channel enabling access to the at least one invitee to the virtual environment, wherein the invitee client device accesses the virtual environment through a user graphical representation that is positioned at the specified 3D coordinates of the virtual environment; and
    stream the live broadcasting session to the at least one invitee client device;
    wherein the virtual environment streaming application selects between a selective forwarding unit (SFU) architecture to forward individual live streams from transmitting client devices to receiving client devices, and a multipoint control unit (MCU) architecture to forward a combined live stream of the live streams from the transmitting client devices to the receiving client devices, wherein the selecting is based on a threshold number of live streams from the transmitting client devices.

2. The system of claim 1, wherein the virtual environment streaming application enables invitees to interact with each other by exchanging real-time audio and video.

3. The system of claim 1, wherein the virtual environment streaming application enables a selection of an exclusive number of invitee user graphical representations to be visible to at least one host of the live broadcasting session, wherein at least one of the selected invitees is enabled to interact with the at least one host of the live broadcasting session.

4. The system of claim 3, wherein the virtual environment streaming platform enables said interactions with the at least one host to become part of a public video stream that is shared with other client devices.

5. The system of claim 3, wherein the virtual environment streaming application further displays a symbolic graphical representation of invitees not comprised within the selection of the exclusive number of invitees.

6. The system of claim 3, wherein the virtual environment streaming application further enables displaying graphical representations of reactions of invitees.

7. The system of claim 3, wherein the virtual environment streaming application enables the audience to explore the virtual environment by moving in the virtual environment.

8. The system of claim 7, wherein the presentation of movement by at least some of the audience members is disabled for the view of the at least one host.

9. The system of claim 1, wherein the field of view of users including hosts and invitees is calculated from the specified 3D coordinate of the virtual environment where the corresponding user graphical representation is positioned.

10. A method executed by at least one processor implementing instructions in memory of at least one server computer, comprising:
   creating a virtual environment based on virtual environment creation instructions from a host client device connected to the at least one server computer via a network;
   connecting the virtual environment to an event that is broadcast through the virtual environment, the event being a live real-world event;
   setting up a live broadcasting session that is broadcast from the virtual environment comprising a broadcast of the event;
   sending an invitation to at least one invitee client device, wherein the invitation comprises 3D coordinates of the virtual environment specified for at least one invitee;
   upon the at least one invitee accepting the invitation, opening up a communication channel enabling access to the at least one invitee to the virtual environment, wherein the invitee client device accesses the virtual environment through a user graphical representation that is positioned at the specified 3D coordinates of the virtual environment;
   streaming the live broadcasting session to the at least one invitee client device; and
   selecting between a selective forwarding unit (SFU) architecture to forward individual live streams from transmitting client devices to receiving client devices, and a multipoint control unit (MCU) architecture to forward a combined live stream of the live streams from the transmitting client devices to the receiving client devices, wherein the selecting is based on a threshold number of live streams from the transmitting client devices.

11. The method of claim 10 further comprising enabling invitees to interact with each other by exchanging real-time audio and video.

12. The method of claim 10 further comprising selecting an exclusive number of invitee user graphical representations to be visible to at least one host of the live broadcasting session, wherein at least one of the selected invitees is enabled to interact with the at least one host of the live broadcasting session.

13. The method of claim 12 further comprising enabling said interactions with the at least one host to become part of a public video stream that is shared with other client devices.

14. The method of claim 12 further comprising displaying a symbolic graphical representation of invitees not comprised within the selection of the exclusive number of invitees.

15. The method of claim 12 further comprising displaying graphical representations of reactions of invitees.

16. The method of claim 10, wherein creating the virtual environment comprises:
   retrieving user preference data; and
   using the user preference data to customize the virtual environment.

17. The method of claim 10, wherein the field of view of the invitee is calculated from the specified 3D coordinate of the virtual environment.

18. A non-transitory computer readable medium comprising instructions stored in memory which, when executed by at least one processor, cause at least one server computer to perform steps comprising:
   creating a virtual environment based on virtual environment creation instructions from a host client device connected to the at least one server computer via a network;
   connecting the virtual environment to an event that is broadcast through the virtual environment, the event being a live real-world event;
   setting up a live broadcasting session that is broadcast from the virtual environment comprising a broadcast of the event;
   sending an invitation to at least one invitee client device, wherein the invitation comprises 3D coordinates of the virtual environment specified for at least one invitee;
   upon the at least one invitee accepting the invitation, opening up a communication channel enabling access to the at least one invitee to the virtual environment, wherein the invitee client device accesses the virtual environment through a user graphical representation that is positioned at the specified 3D coordinates of the virtual environment;
   streaming the live broadcasting session to the at least one invitee client device, wherein a field of view of the invitee is calculated from the specified 3D coordinates of the virtual environment; and
   selecting between a selective forwarding unit (SFU) architecture to forward individual live streams from transmitting client devices to receiving client devices, and a multipoint control unit (MCU) architecture to forward a combined live stream of the live streams from the transmitting client devices to the receiving client devices, wherein the selecting is based on a threshold number of live streams from the transmitting client devices.

19. The non-transitory computer readable medium of claim 18, wherein the steps further comprise enabling invitees to interact with each other by exchanging real-time audio and video.

20. The non-transitory computer readable medium of claim 18, wherein the steps further comprise selecting an exclusive number of invitee user graphical representations to be visible to at least one host of the live broadcasting session, wherein at least one of the selected invitees is enabled to interact with the at least one host of the live broadcasting session.

* * * * *